United States Patent
Geib et al.

(10) Patent No.: US 12,292,876 B2
(45) Date of Patent: May 6, 2025

(54) COMPUTER ARCHITECTURE FOR PLAN RECOGNITION

(71) Applicant: Smart Information Flow Technologies, LLC, Minneapolis, MN (US)

(72) Inventors: Christopher William Geib, Minneapolis, MN (US); Scott Ehrlich Friedman, Minneapolis, MN (US); Pavan Kantharaju, Medford, MA (US); Robert Prescott Goldman, Minneapolis, MN (US)

(73) Assignee: Smart Information Flow Technologies, LLC, Minneapolis, MN (US)

( * ) Notice: Subject to any disclaimer, the term of this patent is extended or adjusted under 35 U.S.C. 154(b) by 0 days.

(21) Appl. No.: 18/140,104

(22) Filed: Apr. 27, 2023

(65) Prior Publication Data

US 2023/0367762 A1     Nov. 16, 2023

Related U.S. Application Data

(60) Provisional application No. 63/341,157, filed on May 12, 2022.

(51) Int. Cl.
*G06F 16/23* (2019.01)
*G06F 16/215* (2019.01)
*G06F 16/901* (2019.01)

(52) U.S. Cl.
CPC ........ *G06F 16/2365* (2019.01); *G06F 16/215* (2019.01); *G06F 16/9024* (2019.01)

(58) Field of Classification Search
CPC ............... G06F 16/2365; G06F 16/215; G06F 16/9024; G06N 3/0442; G06N 3/0464;
(Continued)

(56) References Cited

U.S. PATENT DOCUMENTS

| 2003/0139902 A1* | 7/2003 | Geib | C02F 1/441 |
| | | | 702/181 |
| 2004/0019603 A1* | 1/2004 | Haigh | G06F 17/18 |
| | | | 707/999.102 |

(Continued)

OTHER PUBLICATIONS

Geib, Christopher W. Lexicalized Reasoning about Actions. Drexel University, College of Computing and Informatics, Department of Computer Science, Philadelphia, 2016.
(Continued)

*Primary Examiner* — Etienne P Leroux
*Assistant Examiner* — Oscar Wehovz
(74) *Attorney, Agent, or Firm* — Young Basile Hanlon & MacFarlane, P.C.

(57) ABSTRACT

A computing machine receives a plurality of observations. The computing machine generates an observation data structure. The computing machine extends, in accordance with the causal structures and hierarchical relationships, the observation data structure to include predicted states or predicted actions that are not from the plurality of observations. The computing machine reduces, in accordance with consistency rules stored in a memory of the computing machine, the extended observation data structure. The computing machine provides an output associated with the reduced observation data structure.

22 Claims, 11 Drawing Sheets

(58) Field of Classification Search
CPC ............ G06N 3/084; G06N 5/01; G06N 7/01; G06N 20/10; G06N 20/20; G06N 3/09
See application file for complete search history.

(56) References Cited

U.S. PATENT DOCUMENTS

| | | | |
|---|---|---|---|
| 2019/0228495 A1* | 7/2019 | Tremblay | B25J 9/1661 |
| 2022/0012613 A1* | 1/2022 | Datta | G06N 20/20 |
| 2023/0064775 A1* | 3/2023 | Abraham | G06N 7/01 |

OTHER PUBLICATIONS

Geib, Christopher W. 2004. Assessing the Complexity of Plan Recognition. Copyright © 2004, American Association for Artificial Intelligence (www.aaai.org).

Geib, C. W., & Swetenham, C. E. (2015). Parallelizing Plan Recognition.

* cited by examiner

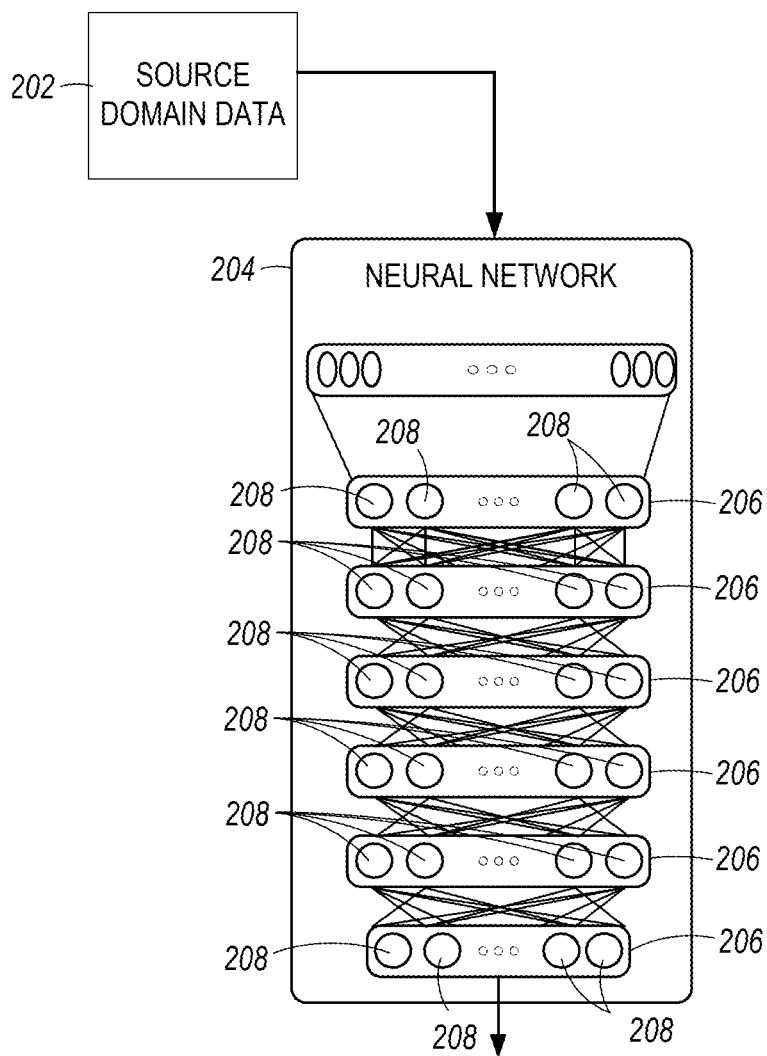
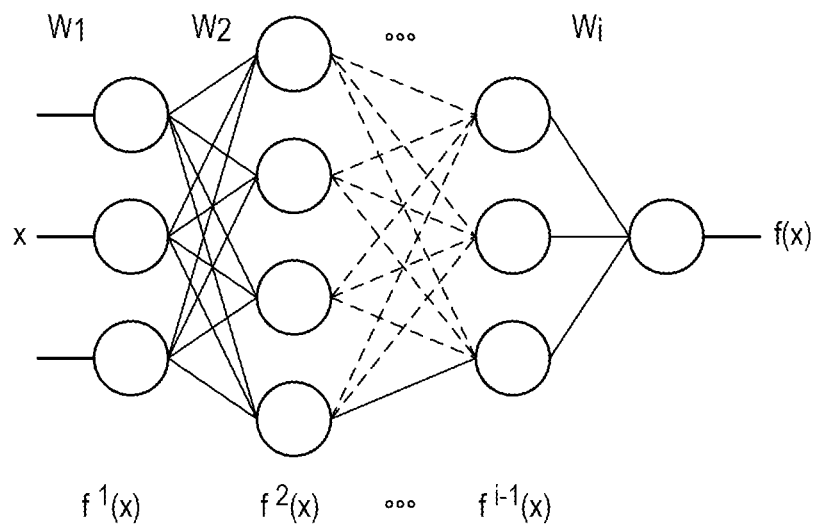
FIG. 2

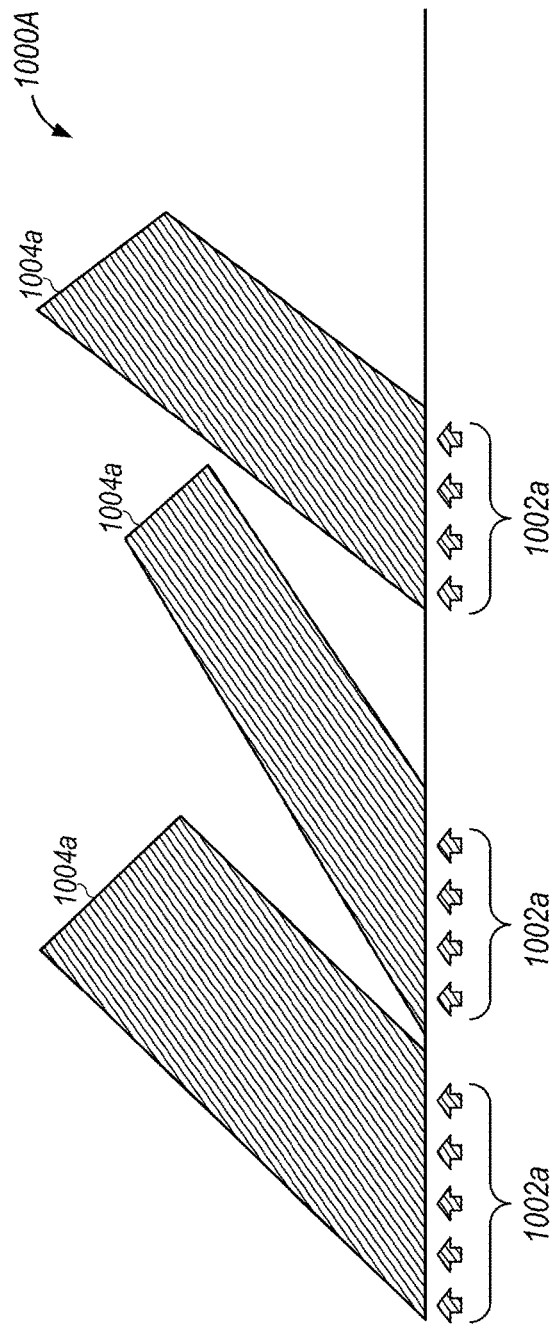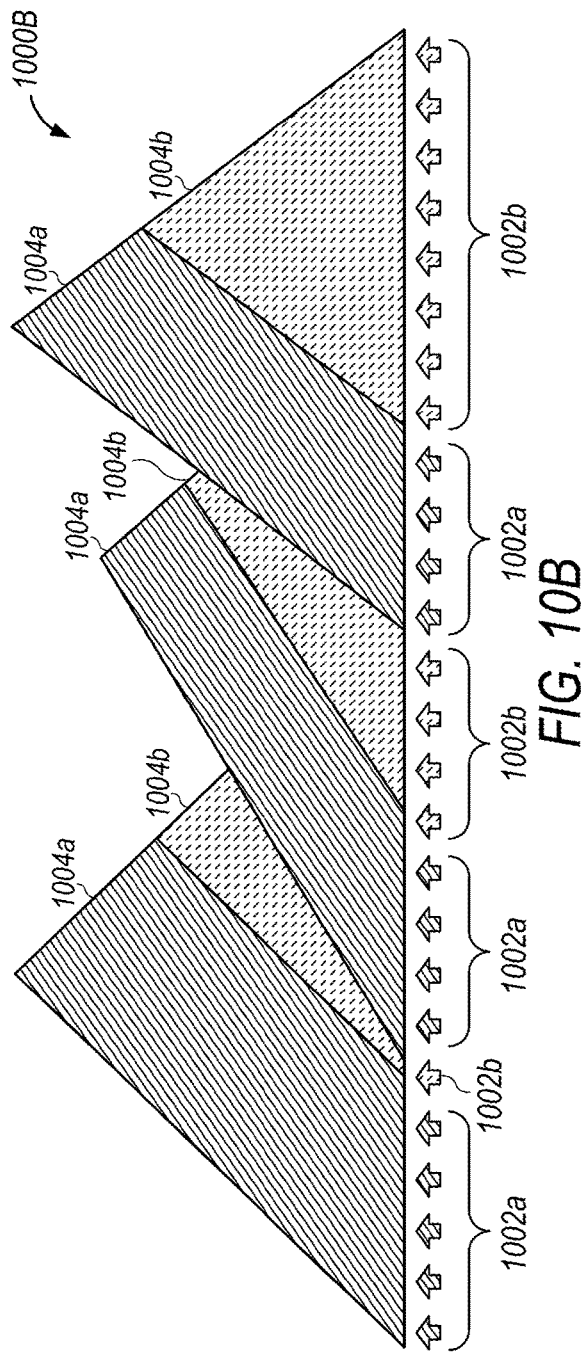

COMPUTER ARCHITECTURE FOR PLAN RECOGNITION

PRIORITY CLAIM

This application claims priority to U.S. Provisional Patent Application No. 63/341,157, filed on May 12, 2022, and titled "COMPUTER ARCHITECTURE FOR PLAN RECOGNITION," the entirety of which is incorporated herein by reference.

TECHNICAL FIELD

Embodiments pertain to computer architecture. Some embodiments relate to artificial intelligence. Some embodiments relate to a computer architecture, system, and method for plan recognition.

BACKGROUND

Plan recognition may be useful in many different contexts, from electronic personal assistants to cyber security and control systems. Computer-implemented techniques for plan recognition may be desirable.

BRIEF DESCRIPTION OF THE DRAWINGS

FIG. 2 illustrates an example neural network, in accordance with some embodiments.

FIGS. 10A-10B illustrate examples of data representing a plan, in accordance with some embodiments.

DETAILED DESCRIPTION

Figure 1:
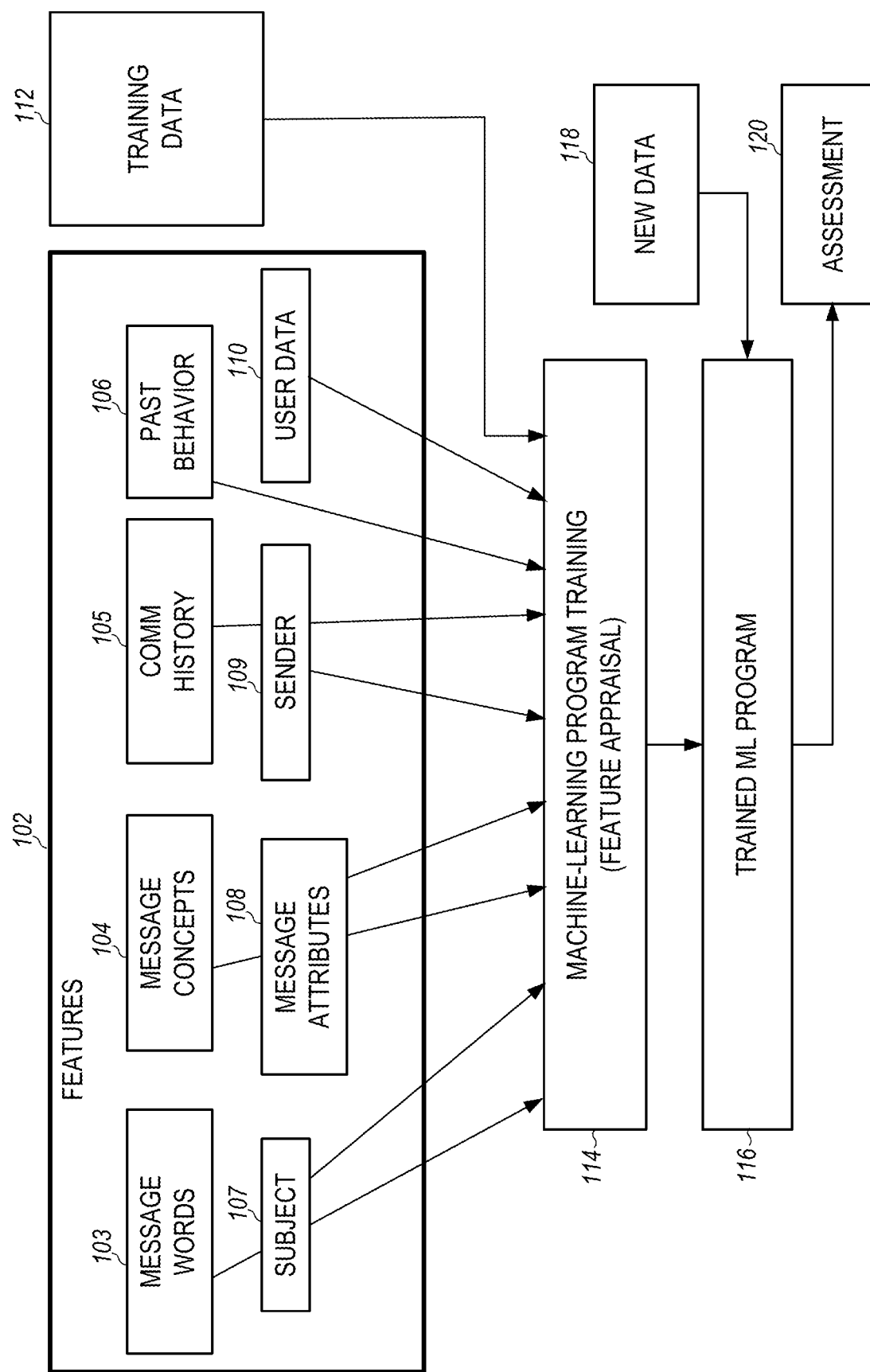
FIG. 1 illustrates the training and use of a machine-learning program, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "model" encompasses its plain and ordinary meaning. A model may include, among other things, one or more engines which receive an input and compute an output based on the input. The output may be a classification. For example, an image file may be classified as depicting a cat or not depicting a cat. Alternatively, the image file may be assigned a numeric score indicating a likelihood whether the image file depicts the cat, and image files with a score exceeding a threshold (e.g., 0.9 or 0.95) may be determined to depict the cat.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
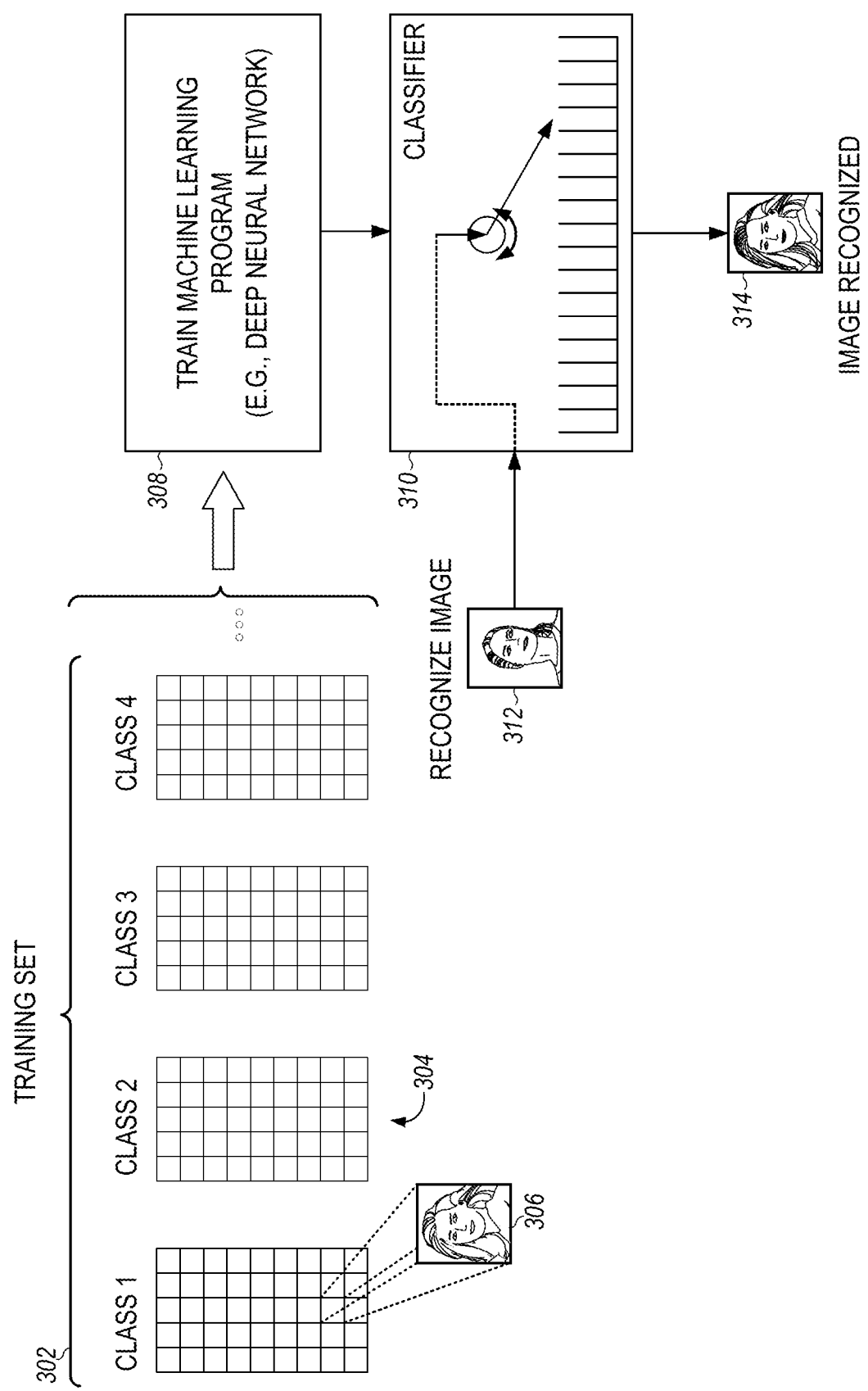
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Barack Obama, one class corresponds to George W. Bush, one class corresponds to Bill Clinton, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
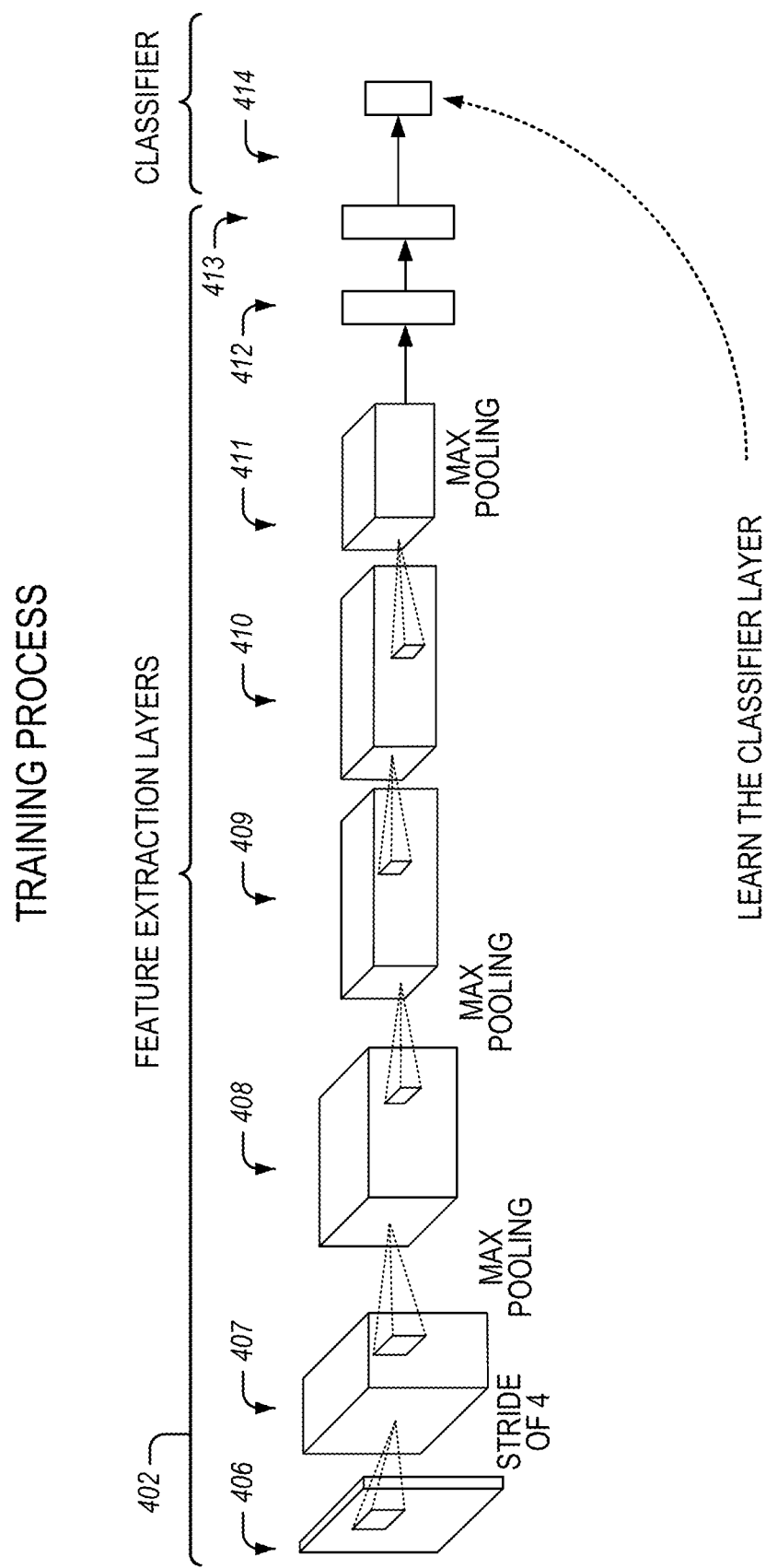
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
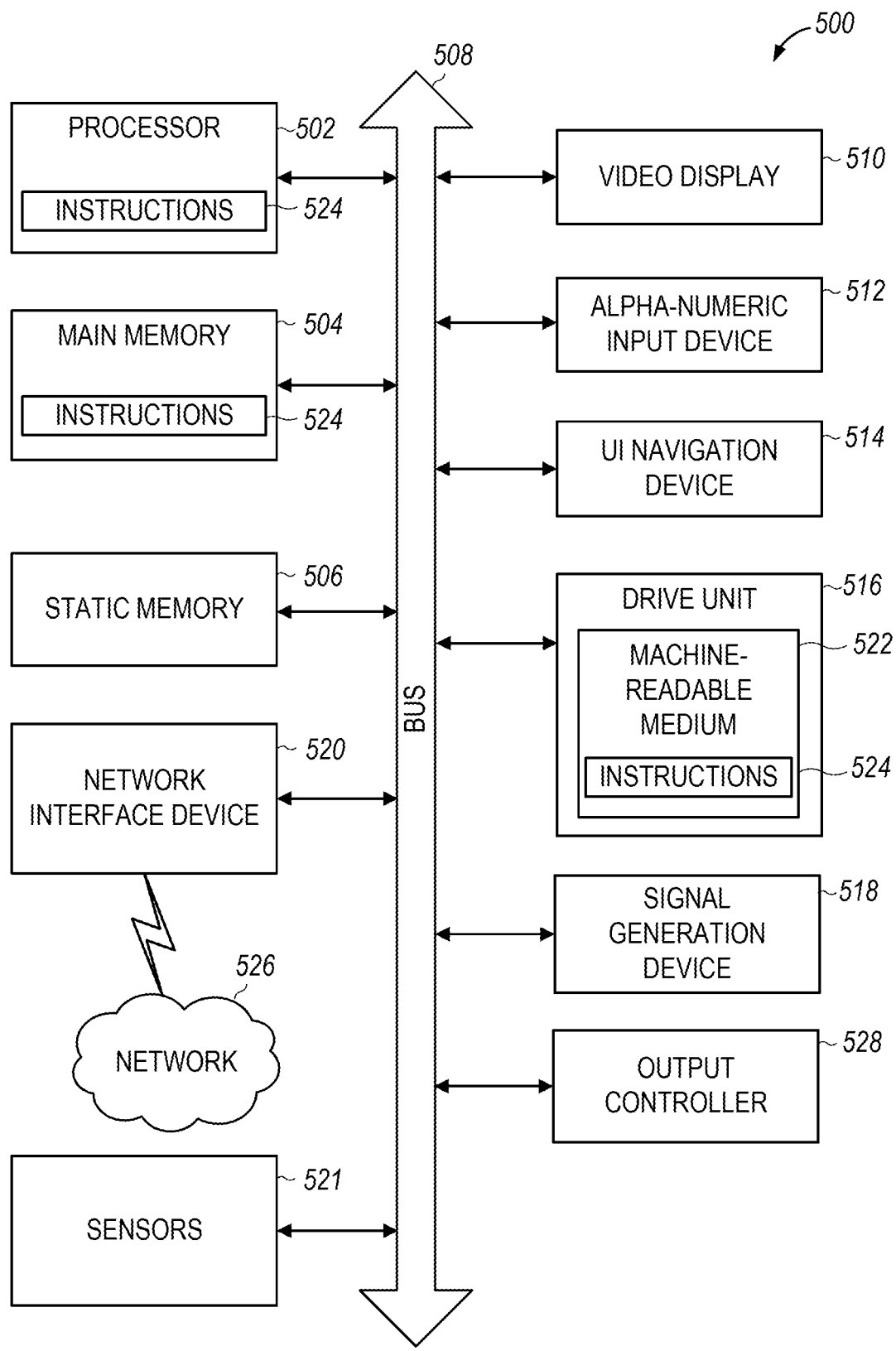
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
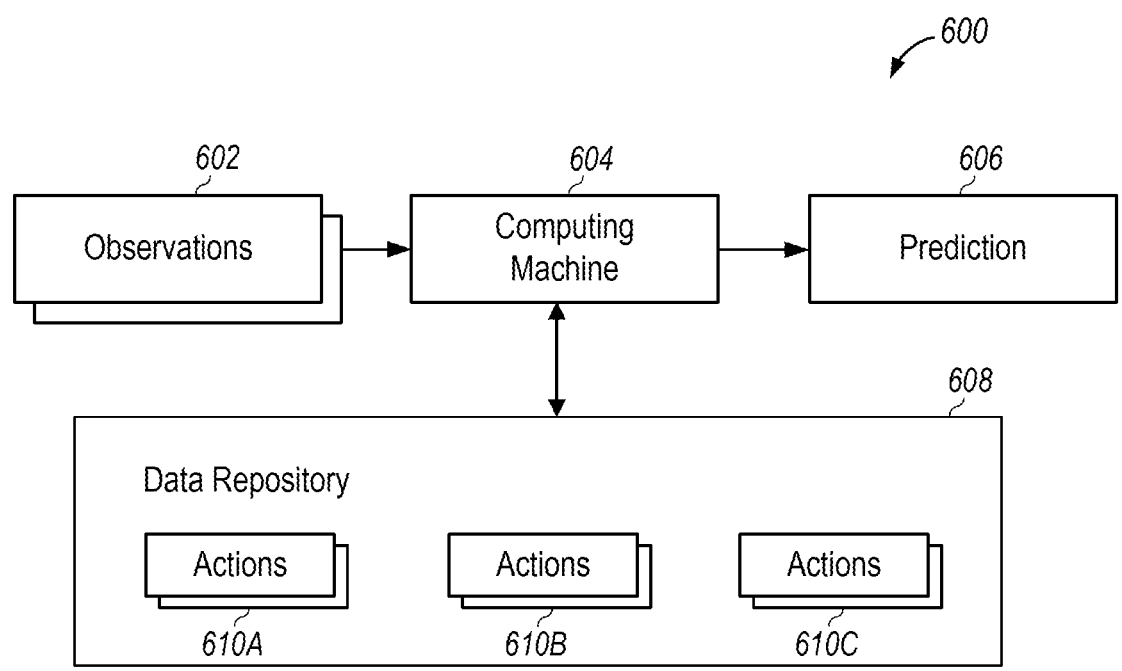
FIG. 6 is a block diagram of an example of a system for plan recognition, in accordance with some embodiments.

FIG. 6 is a block diagram of an example of a system 600 for plan recognition, in accordance with some embodiments. As shown in FIG. 6, observations 602 are accessed by a computing machine 604, and the computing machine 604 generates a prediction 606 based on the observation 602. To generate the prediction 606, the computing machine 604 accesses a data repository 608 that stores sets of actions 610A, 610B, and 610C.

The computing machine 604 may include some or all of the components of the computing machine 500. The computing machine 604 may be at least one of a server, a client device, a laptop computer, a desktop computer, a mobile phone, a tablet computer, or the like. The data repository 608 may be a database or any other data storage unit.

The computing machine 604 receives the observations 602, which may include action or state change observations. The computing machine 604 accesses the data repository 608. The data repository 608 stores data structures representing actions 610A, 610B, 610C and their effects on the world, possible goals and plans or rules about how plans can be constructed to achieve the goals. While three data structures of actions 610A, 610B, 610C are illustrated, the data repository 608 may include other numbers of data structures of actions, with each data structure including various numbers of actions. As used herein, an action may include, among other things, a first order logical representation of an act, including the name of the act type and the names of any parameters of the act. Examples of actions include graspA (lefthand, box23), liftA(lefthand), openA(lefthand, door23), or the like. An agent may be, among other things, an actor in the world (e.g., who performs an action). An actor may include one or more humans, one or more vehicles, one or more systems, a system including multiple subsystems, or the like. As used herein, a goal may include a first order predicate or conjunction of first order predicates that identify at least one state of the world that can be the objective of some agent. For example, inRoomP(block7, room23) captures the goal that some agent wished block7 to be in room23. Some implementations support the presence of typed variables in their goal specification. For example, inRoomP(block7, X:room) denotes the goal that block7 is in some room that is likely to be bound at a later time in the plan. As used herein, a state may include a first order conjunction of ground predicates intended to capture a state of the world. Each such ground predicate has a predicate name and can have parameters that provide the predicate's grounding. For example, onP(block1, block23), inhandP (lefthand, block25), openP(door23), rainingP( ), or the like.

In processing the received observations 602, the computing machine 604 identifies a set of plan prefixes corresponding to the plurality of action and state change observations 602 by mapping the plurality of action and state change observations 602 to data structures representing sets of actions (e.g., one or more of the data structures representing sets of actions 610A, 610B, 610C). An example of mapping observations 602 to one of the data structures representing sets of actions 610A, 610B, 610C is described in conjunction with FIG. 8. Some of the plan prefixes in the set of plan prefixes may include data that captures future subgoals of a plan. The future subgoals may lack evidence supporting themselves in the received observations 602.

As used herein, a plan may include a sequence of actions which is executed in order achieve a goal. In some implementations, a plan is represented as a sequence of action observations connected by their associated causal structures and hierarchical relationships. As used herein, the phrase "plan prefix" encompasses its plain and ordinary meaning. A plan prefix may include a part of a plan. For example, a grocery shopping plan may include the actions: (1) drive to supermarket, (2) place groceries in shopping cart, (3) pay for groceries, and (4) drive home. A plan prefix of this plan may include (1) drive to supermarket, and (2) place groceries in shopping cart, but not (3) pay for groceries, and (4) drive home. In one use case, a computing machine may observe a person named Alex (1) drive to supermarket, and (2) place groceries in shopping cart. Based on these observation, the computing machine may assume that Alex has the future subgoals of (3) pay for groceries, and (4) drive home. The future subgoals may lack evidence for themselves in the prior observations of Alex. In some cases, the predictions of the computing machine may be incorrect, as Alex's activities may be consistent with other plans (which may or may not be represented in the sets of actions 610A, 610B, 610C stored in the data repository 608). For example, the observations of Alex (1) driving to supermarket and (2) placing groceries in shopping cart may be consistent with Alex being an employee of the supermarket who assists customers with curbside pick-up, in which case Alex would not (3) pay for groceries, but would (4) drive home after his shift is over. Alternatively, Alex may be a customer at the supermarket and may (3) pay for groceries, but might drive to another destination (e.g., Alex's workplace or a restaurant) after paying for the groceries, in which case Alex would not (4) drive home (at least until after Alex departs from the other destination). In another alternative, Alex may put back the groceries in the shopping cart and may be picked up from the grocery store by a friend, while Alex's spouse later obtains Alex's car from the grocery store parking lot, in which case Alex would neither (3) pay for groceries nor (4) drive home.

In another example use case, a computing machine observes (e.g., via a camera coupled to the computing machine) a person named Ben pick up a pot, fill the pot with water, and pull a box of pasta off the kitchen shelf. Based on these observations, the computing machine may determine, with a high degree of certainty, that Ben is making some kind of pasta dish. The plan recognizer executing on the computing machine may have multiple different hypotheses about what kind of sauce Ben are making for the pasta or whether Ben is making sauce at all. In at least one of the hypotheses, the plan recognizer may consider that Ben was going to make marinara sauce. To do this, the plan recognizer would have a node in the data structure that would capture the future sub-goal for making marinara sauce. This sub-goal might initially lack evidence supporting itself, and might correspond to the blocks 1002b, 1004b shown in FIG. 10B. In other words, the plan to make marinara sauce would not be directly supported by any of the observations (i.e., the computing machine has only seen indirect evidence for this future sub-goal). The computing machine has not observed Ben pull out a jar of sauce, or the ingredients for making the sauce, or any of the other sub-steps of a plan for making the sauce). As illustrated in FIG. 10B and described in greater detail below, the planner would create hypothetical plans for the making of the marinara sauce and add them to the data structure.

The computing machine 604 computes a prediction of the complete plan execution from each plan prefix by searching through the plurality of data structures representing actions 610A, 610B, 610C to find at least one completion of the plan, filling in details for each of the unsupported future subgoals of the plan that can be inferred to product the goal of the plan, and marking the plan completion as a prediction of the rest of the execution of the plan.

In some implementations, the data structures representing actions 610A, 610B, 610C represent plans, and the data structures are tree structures with leaf nodes and root nodes. The root node identifies the entire plan (e.g., "grocery shopping," as described above). The leaf nodes include individual actions of the plan (e.g., (1) drive to supermarket, (2) place groceries in shopping cart, (3) pay for groceries, and (4) drive home, as described above). An example of a tree data structure representing a plan is described in conjunction with FIG. 8.

The computing machine 604 generates the prediction 606, using the data structures representing actions 610A, 610B, 610C, a complete sequence of future actions (and implied states) that complete the plan(s) associated with the plan prefix(es) identified from the observations 602. The computing machine 604 provides outputs associated with the prediction 606. The outputs may include all or a portion of the current inferred and future predicted plans. The outputs may include visual or audio outputs provided via a display device or a speaker. The outputs may include data transmitted over a network or over a direct wired or wireless connection.

Figure 7:
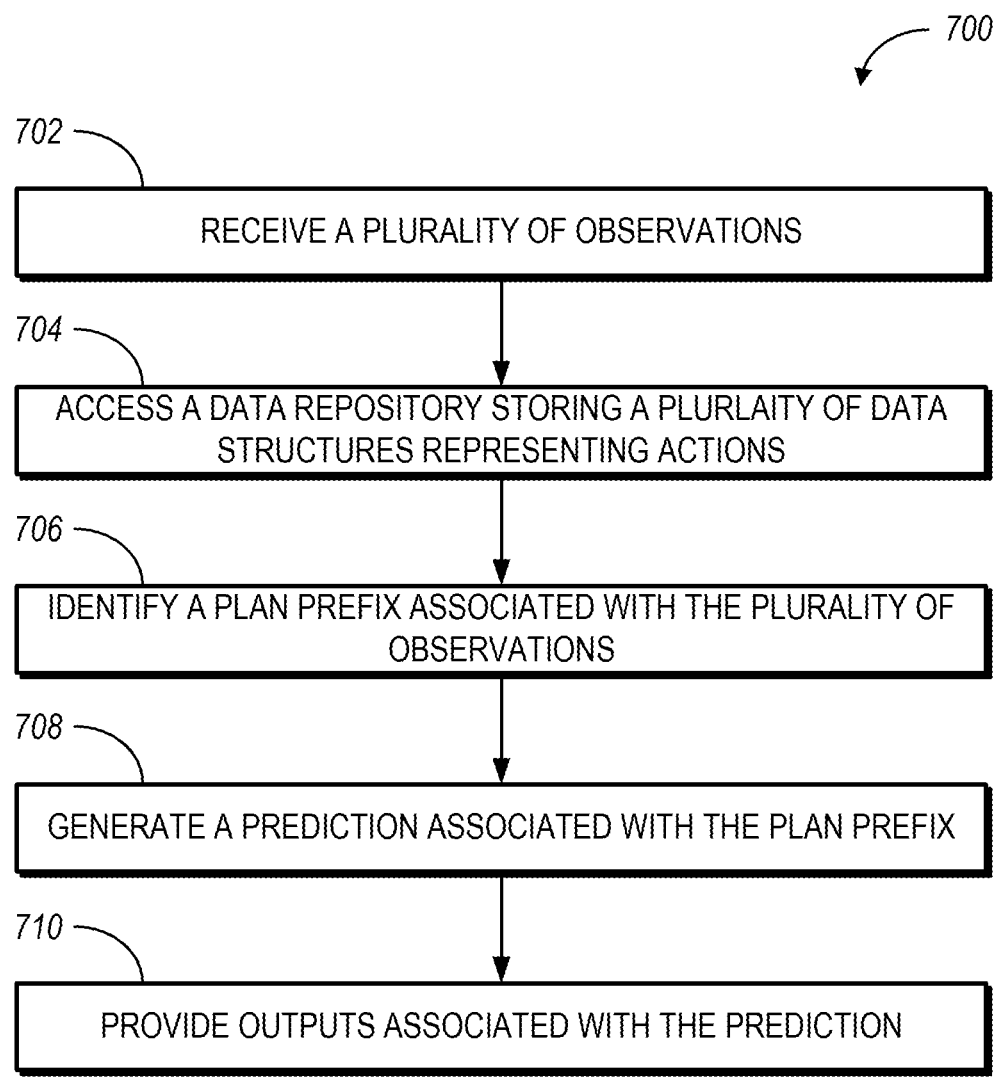
FIG. 7 is a flow chart of an example of a method for plan recognition, in accordance with some embodiments.

FIG. 7 is a flow chart of an example of a method 700 for plan recognition, in accordance with some embodiments. As described below, the method 700 is performed by the computing machine 604. However, in alternative implementations, the method 700 may be performed by other machines, for example, a machine including all or a portion of the components of the computing machine 500.

At block 702, the computing machine 604 receives a plurality of observations 602. The observations 602 may be received from sensor(s) in real-time. The sensor(s) may include any sensors, such as a camera (visual spectrum, infrared, or ultraviolet light sensor), a microphone (audio sensor), a temperature sensor, a pressure sensor, a chemical sensor, or the like. Alternatively, the observations 602 may be obtained from a data storage unit or manually entered into the computing machine 604 by a user.

As used herein, the term "real-time" may include, among other things, the output being provided without any intentional delays after the input is received. There may still be some unintentional delays, for example, due to the processing speed or the network connection speed of the computing machine and/or other processes executing on the computing machine in parallel with the technique described herein.

At block 704, the computing machine 604 accesses a data repository 608 storing a plurality of data structures representing actions 610A, 610B, 610C. The data structures representing actions 610A, 610B, 610C may represent actions in action-outcome relationships or goal-oriented activities. In some examples, the plurality of data structures representing actions 610A, 610B, 610C comprise tree data structures. Each tree data structure has a root node representing a goal of a plan and leaf nodes representing the actions associated with the plan. In some examples, a data structure (from among the data structures in the data repository) stores an ordered set of actions. The ordered set of actions represents multiple actions to cause an outcome or multiple actions of a goal-oriented activity. For example, an ordered set of actions in an action set for taking may be: (1) reach, (2) grasp, and (3) lift. An ordered set of actions in an action set for grocery shopping may be: (1) drive to supermarket, (2) place groceries in shopping cart, (3) pay for groceries, and (4) drive home.

At block 706, the computing machine 604 identifies, by mapping at least a portion of the plurality of observations 602 onto at least a part of one or more of the plurality of data structures representing actions 610A, 610B, 610C, a plan prefix associated with the plurality of observations 602. The plan prefix includes a future subgoal and a set of actions. In some examples, the plan prefix is mapped to a timeline. The timeline indicates predicted states based on a plan associated with the plan prefix. A predicted state may include a state added to an observation data structure by the planning process. The predicted state may correspond to the result of the execution of predicted actions at some time in the future. The predicted state may be a part of a plan to complete one of the plans inferred by the plan recognizer. A predicted action may include an action added to an observation data structure by the planning process. The predicted action may be executed at some time in the future as part of a plan to complete one of the plans inferred by the plan recognizer.

At block 708, the computing machine 604 generates a prediction 606 based on the plan prefix. The prediction 606 includes a future action or a future outcome. The prediction 606 may be generated based on physics data, traffic data, or capability data. The physics data may include representations of the laws of physics. The traffic data may include real-time traffic data obtained by sensors, average or predicted traffic data obtained based on traffic patterns. For example, traffic on a highway going into a city center at 8:00 AM on a weekday morning is likely to be similar to traffic on that highway at 8:00 AM on other weekday mornings.

At block 710, the computing machine 604 provides an output (or multiple outputs) associated with the prediction 606. The output is associated with the future action or the future outcome in the prediction 606. The output may be transmitted to a local display unit, speaker or printer, or transmitted over a network for further processing at a remote machine.

In some implementations, the method 700 is performed using a multithreaded GPU (or other multithreaded processing circuitry) of the computing machine 604 (which may be a server farm that includes multiple computers). The multiple threads may be used to receive different observations (e.g., associated with different actors) and identify plans corresponding to the different observations in real-time and in parallel. In some cases, identification of a single plan may involve multiple threads. For example, different threads may be used to compare a set of observations with different sets of actions 610A, 610B, 610C which may correspond to plan prefixes stored in the data repository 608.

According to some implementations, the plan prefix is associated with a first plan. The computing machine 604 identifies a second plan prefix associated with the plurality of observations 602. The second plan prefix is associated with a second plan. The computing machine 604 determines that a conflict exists between the first plan and the second plan, for example, due to both plans requiring a common item (e.g., spouses who share a single car plan to drive to different places at the same time). The computing machine 604 identifies a proposed resolution for the conflict (e.g., one of the spouses using a different mode of transportation). The computing machine 604 provides an output indicating the conflict and the proposed resolution. The computing machine 604 may use the observations 602 and the data structures representing actions 610A, 610B, 610C in the data repository 608 that were used to identify the plan prefix associated with the first plan and the second plan prefix associated with the second plan to project a final state of the world and determine if the first plan and/or the second plan would be able to be executed to completion. If the first plan and/or the second plan would not be able to be executed to completion, there is a conflict and a resolution may be proposed.

In one example, the computing machine 604 observes (in the observations 602) a chef making two different salads, one is leafy greens and one is a cold pasta for a formal dinner. The computing machine 604 observes, via the observations 602, multiple steps of both plans (the plan to make the leafy greens salad and the plan to make the cold pasta salad) and is very confident of its recognition of the goals of each of the plans. However, the computing machine 604 has access to data indicating that there is only one bowl for serving salads on the table. As the computing machine 604 becomes more and more confident of the goals and plans the computing machine 604 also becomes more confident that the chef intends that both salads are to be ready at the same time and served at the same time. However, this is a problem because only one of the salads can use the serving bowl at a time. Thus, the computing machine 604 is unable to create, in its memory, a state where both salads are served at the same time. As a result, a conflict is identified. To find a resolution to propose, the computing machine 604 accesses data structures that allow it to use its planning algorithm to infer that if the chef is willing to serve the salads in series, and that the chef can wash the bowl between the two courses. Thus, the computing machine 604 provides an output indicating that both salads cannot be served simultaneously because only one bowl is available, and an output indicating a recommendation to serve the salads in series and to wash the bowl between the two salad courses.

According to some implementations, the prediction 606 indicates a failure of a plan associated with the plan prefix. The computing machine 604 identifies a proposed resolution that allows for success of the plan. For example, by accessing observed states of the world and allowing the planner engine of the computing machine 604 to project the state of the world forward, the computing machine 604 may identify plans that will fail and even alternative plans that will succeed and what could be changed so that the original plan would succeed. The computing machine 604 provides an output indicating the proposed resolution (e.g., an alternative plan or a change to the original plan that would cause the original plan to succeed). The computing machine 604 may determine, among other things, that an item (e.g., from a stored inventory of items, which may be stored at the computing machine 604, at the data repository 608, or at one or more other machines accessible to the computing machine 604, e.g., via a network) associated with a plan is missing or being used for another plan that is already being implemented, or that the plan cannot be completed for another reason (e.g., based on physics data, traffic data, or capability data). For example, if a plan requires a person named Betsy to be at ABC Coffee House in 30 minutes but, due to traffic, Betsy requires 60 minutes to drive to ABC Coffee House, the computing machine may determine that Betsy's plan is going to fail.

A resolution may be determined based on the nature of the plan. For example, if Betsy's plan is to drink a cup of coffee alone (e.g., based on an indication Betsy provided to the computing machine 604 or based on stored calendar data of Betsy), the computing machine 604 may recommend that Betsy make her own coffee at home. If Betsy is meeting a colleague (e.g., based on a calendar event in Betsy's calendar or a calendar invite or email that Betsy sent or received that is stored at the computing machine 604) at ABC Coffee House, the computing machine 604 may recommend that Betsy reschedule the meeting or move the meeting to a different location. In some implementations and with appropriate permissions from Betsy's colleague, the computing machine may access a tracked (e.g., via a mobile device associated with Betsy's colleague) location of Betsy's colleague. If both Betsy and her colleague are likely to be late to the meeting at ABC Coffee House, the computing machine may notify Betsy that both she and her colleague are running late, and propose delaying or rescheduling the meeting (or changing a location of the meeting, for instance, to a coffee shop that is closer than ABC Coffee House). In some cases, the computing machine may, automatically or in response to a request from Betsy, automatically compose a written, audio or video message for transmission to an address (e.g., an email address, a telephone number, or an address in an instant messaging service) associated with Betsy's colleague proposing delaying, rescheduling, and/or changing a location of the meeting.

In one example, the computing machine 604 observes (via the observations 602) a chef making a salad for a formal dinner. However, the computing machine 604 determines, based on data accessible to the computing machine 604 (e.g., an electronic inventory of items in the kitchen, which may be persistently monitored, for example, using sensor(s) in the kitchen), that there are no bowls that are appropriate for placing the salad on the table. The computing machine 604 identifies a plan for completing making the salad and serving the salad, but determines that the serving of the salad in the formal dinner environment is not possible due to the lack of a bowl. To propose a resolution, the computing machine 604 may determine that the dinner may be made less formal. The salad may then be served in the container used for the preparation of the salad. The computing machine 604 may determine that the serving of the salad in the container used for the preparation of the salad is similar to the original proposal of serving the salad in the (nonexistent) formal bowl.

Figure 8:
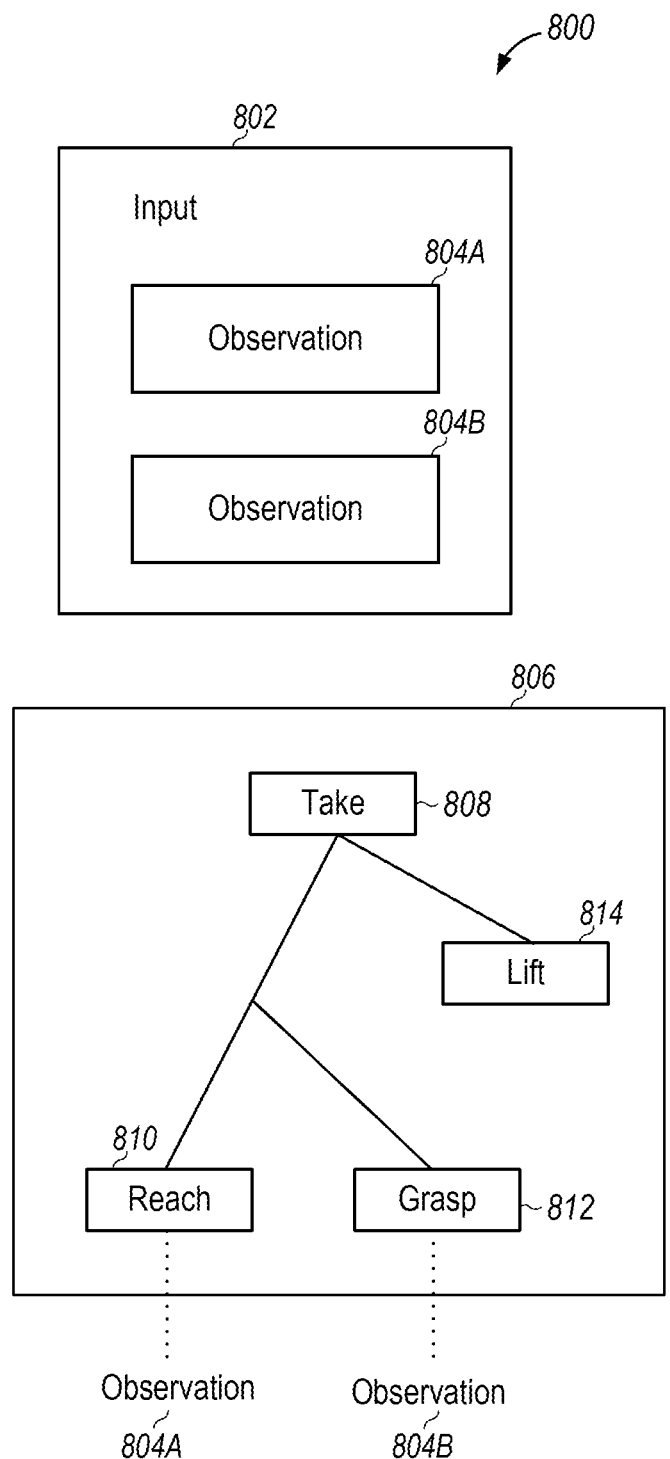
FIG. 8 illustrates example data structures which may be used for plan recognition, in accordance with some embodiments.

FIG. 8 illustrates example data structures 800 which may be used for plan recognition, in accordance with some embodiments. As shown, the data structures 800 include an input data structure 802 with observations 804A, 804B, and a data structure representing actions 806 in a plan. The observations 804A, 804B may correspond to the observations 602 of FIG. 6. The data structure representing actions 806 may correspond to one of the data structures 610A, 610B, 610C in the data repository 608.

As shown, the data structure representing actions 806 in a plan is associated with a plan to take an object. The data structure representing actions 806 has a tree structure with the root node 808 representing the "take" plan. The tree structure also has three leaf nodes 810, 812, 814 representing individual actions in the "take" plan—"reach" 810, "grasp" 812, and "lift" 814.

As illustrated, observation 804A is mapped to the "reach" leaf node 810 and observation 804B is mapped to the "grasp" leaf node 812. This mapping may be based on using artificial intelligence or machine learning techniques (e.g., as described in conjunction with FIGS. 1-4) to identify that imagery (or other data) in the observation 804A corresponds to reaching and that imagery (or other data) in the observation 804B correspond to grasping. Based on this mapping, a computing machine (e.g., the computing machine 604) may determine that a "take" plan is being implemented because "reach" (per leaf node 810) and "grasp" (per leaf node 812) have been completed. The computing machine may make a prediction that "lift" (per leaf node 814) is likely to be attempted.

The computing machine may make a prediction about whether the "lift" is to be successful. In one example, an object is being taken by a worker who is capable of lifting a maximum of 50-70 kg. (Information representing the worker's capabilities and/or the mass of the object may be stored at the computing machine or at a data repository to which the computing machine is connected.) If the object has a mass of 45 kg, the computing machine may predict that the "lift" is to be successful.

However, if the object has a mass of 90 kg, the "lift" is likely to fail. In this case, the computing machine may propose (e.g., via its output) various remediations to allow the "lift" to succeed. For example, the computing machine may propose that a stronger worker lift the object instead of the worker who is capable of lifting the maximum of 50-70 kg or the computing machine may propose that a second worker or a machine assist the worker who is capable of lifting the maximum of 50-70 kg with the "lift."

In some cases, the computing machine may identify that two ongoing plans conflict with one another. For example, at 18:15 on a Friday evening, the computing machine may determine that a patent attorney has a plan to "take wife to dinner" at 19:00 (with the dinner requiring two hours of time for travel and dining) and a plan to "finish and file patent application" by 23:59 (with the patent application requiring 5.5 hours of labor). The "take wife to dinner" plan may be identified based on a dinner reservation made by the patent attorney. The "finish and file patent application" plan may be identified based on the patent attorney communicating with the client (e.g., based on an artificial intelligence analysis (e.g., as described in conjunction with FIGS. 1-4) of text in the communications between the patent attorney and the client indicating that the patent application must be filed by 23:59 that evening) and beginning the drafting of the patent application.

In this case, the computing machine may generate output indicating that the two plans conflict with one another. The computing machine may output one or more proposed remediations, for example, "reschedule dinner with wife," or "reassign patent application to associate." After receiving an appropriate response from the user, the computing machine may automate the rescheduling of the dinner (e.g., by automatically modifying a reservation or automatically telephoning the restaurant and having a receptionist at the restaurant hear a recording indicating the rescheduling request or by automatically sending an email to the associate indicating the reassignment of the patent application).

The disclosed technology may be useful in various domains. For example, in computer cyber security, the disclosed technology may be leveraged in security system configuration tools and in recognizing the plans of hostile actors. Actions of various actors in a network system may be observed and a prediction may be made that a certain actor is making hostile actions based on the actions of the actor. For example, if a plan for a hostile act includes steps A, B, C, D, and E, an actor that performs steps A and B may be predicted to be preforming the hostile act.

In control systems for manufacturing, the disclosed technology may be used in graphical user interfaces (GUIs) for control or manufacturing systems, oil refineries, chemical or other manufacturing. An engine associated with the GUI may detect steps being performed by an operator and may predict the operator's likely next steps. User interface elements for performing these next steps may be presented via the GUI.

The disclosed technology may be used in control systems for transport scheduling and logistics, by identifying plans associated with transport needs or desires. In addition, conflicts between transportation plans (e.g., two drivers plan to drive the same truck) may be detected and resolved. The disclosed technology may be used in assistive systems for elderly people, for example, in "smart" at home monitoring for elderly people to assist them with activities of daily living (ADLs). A users actions may be observed to identify an ADL that the user is attempting as well as a likelihood that the user will succeed. If the likelihood is below a threshold (e.g., 50%), remediations to increase the likelihood of success (or decrease the likelihood of injury) may be suggested.

The disclosed technology may be useful in spoken or natural language-based interfaces, for example, automated call centers, personal digital assistants, self-driving cars, household appliances, and chat bots. The disclosed technology may be useful in spoken, textual, or GUI-based intelligent personal assistant systems. A personal digital assistant may receive input from a user and suggest next steps. For example, a plan to book travel may include the steps: (1) book flight, (2) book hotel, and (3) book rental car. If a user books a flight using the personal digital assistant, the personal digital assistant may suggest also booking a hotel and/or a rental car.

The disclosed technology may be useful in a computer system designed to assist users with a task or configuration process, which may be spoken, textual, or GUI-based. For example, the disclosed technology may detect a user's intentions for a software system while the software system is being configured. Steps in the configuration process may be configured based on the intentions. For example, a user using tax software to file simple personal returns may need a different tax software installation from a user who is using the tax software to file more complex returns for corporations or high-net-worth individuals.

The disclosed technology may be useful in video games which may have believable non-player characters with which human player(s) may interact. The non-player character may access an engine that predicts future actions of the human player(s) based on their previous actions, as described herein. The domains described herein are provided as examples only and do not limit the disclosed technology.

In one example, the disclosed technology may be useful in a delivery system. The technology may identify delivery plans, for example, based on activities of delivery drivers. The disclosed technology may determine when certain delivery plans are likely to fail and/or whether certain delivery plans conflict with one another, and may provide remediation steps to reduce the failure rate. The remediation steps may be provided to a device of a manager of the delivery system (or a messaging address associated with the manager), for example, via push notification, online chat application, short messaging service (SMS), or email.

In one example, the disclosed technology is useful in assisting an elderly person with ADLs. A computing machine may observe (e.g., using at least one of a camera, a microphone, a radar system, a lidar system, or the like) activities of the elderly person, identify plan(s) of the elderly person based on the observed activities, determine whether the identified plan(s) are likely to succeed or fail, and/or suggest remediation steps for plan(s) that are likely to fail. The suggested remediation steps may be provided using an audio or visual output of the computing machine.

Figure 9:
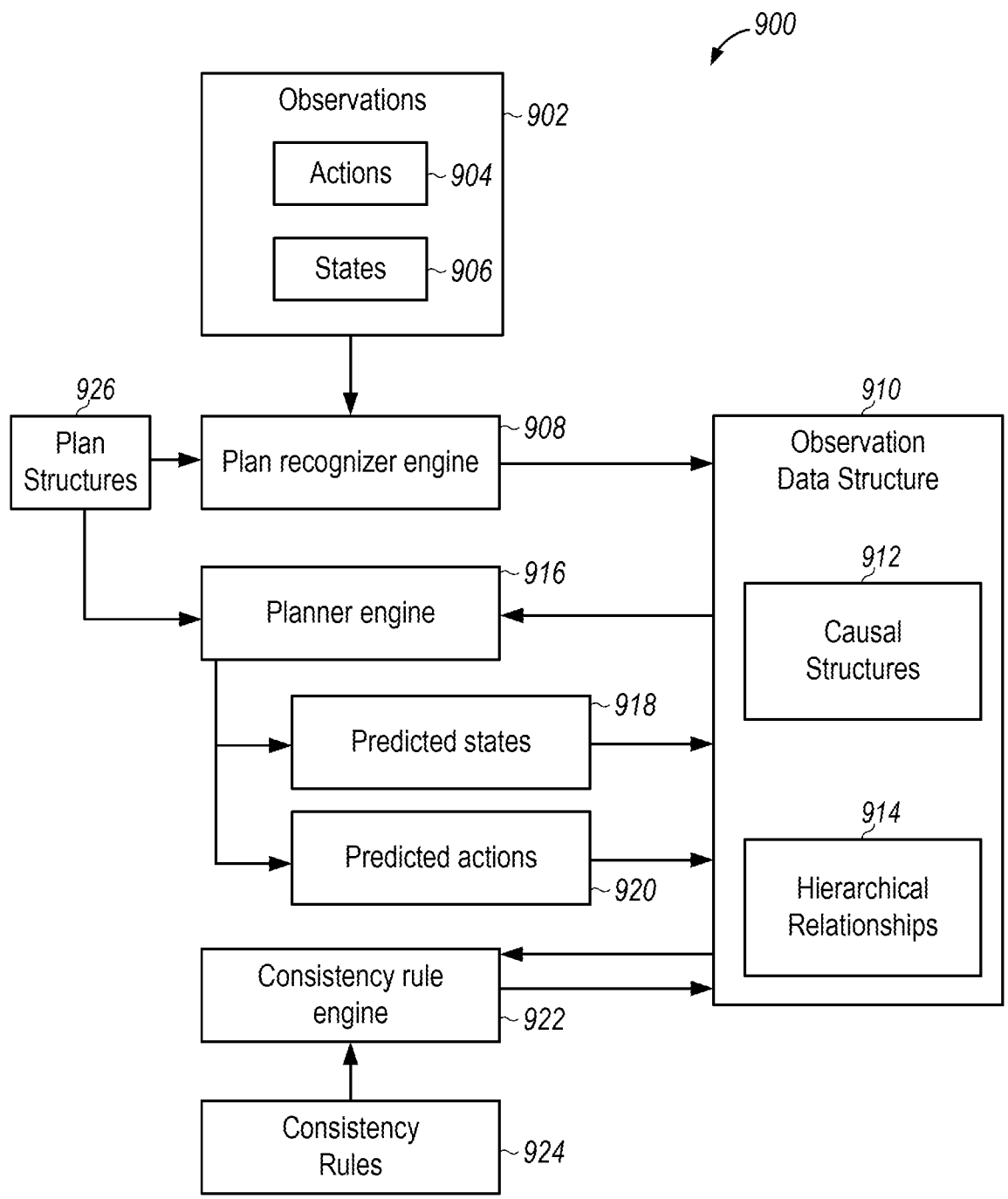
FIG. 9 is a block diagram of an example of a plan recognition system, in accordance with some embodiments.

FIG. 9 is a block diagram of an example of a plan recognition system 900, in accordance with some embodiments. The plan recognition system 900 may be implemented in software, hardware, or a combination of software and hardware residing at one or more computing machines (e.g., the computing machine 500). As shown, the system 900 stores observations 902, which include actions 904 and states 906. The actions 904 may be associated with an agent (e.g., a human) or the environment (e.g., weather actions) and may involve activity of the user or the environment. The states 906, similarly, may be associated with an agent (e.g., a person named Jack is in his car and driving east on Main Street) or the environment (e.g., the bridge over the river at the east end of Main Street is closed to vehicular traffic). The observations 902 may be obtained via sensors (e.g., a camera, a microphone, a temperature sensor, a pressure sensor, or the like) from an environment. Alternatively, the observations 902 may be manually entered into the one or more computing machines or may be obtained via application of machine learning techniques (e.g., natural language processing) to one or more data sources (e.g., online newspaper articles, social media posts, or the like).

As shown, the observations 902 are provided to a plan recognizer engine 908. The plan recognizer engine 908 generates an observation data structure 910. The observation data structure 910 represents causal structures 912 and hierarchical relationships 914 based on the states 904 and the actions 906 in the observations 902. According to some examples, the observation data structure 910 is a graph data structure including nodes and edges connecting the nodes. The nodes represent the states 906 and the actions 904. The edges represent the causal structures 912 and/or the hierarchical relationships 914 between the nodes. The causal structures 912 may include at least one of a causal relationship between two or more actions from the actions 904, a state change associated with one or more actions from the actions 904, or a subplan of an agent performing at least a portion of the actions from the actions 904. The causal structures 912 may be sub-graph structures that capture the causal relationships between action nodes and predicate nodes that make up states and goals. For example, the action of opening a door with the left hand causes the door to be open, i.e., openA(lefthand, door23)→openP(door23). The hierarchical relationships 914 may include subgraph structures that capture the relationships and ordering constraints between groups of action nodes. The action nodes capture the fact that when the actions are executed in an order that meets the ordering constraints, the actions can result in the accomplishment of a known state of the world, plan, or other larger sub-units of observation data structure. For example, the sequence of actions graspA(lefthand, block2), liftA (lefthand), moveoverA(lefthand, block3), releaseA (lefthand) can all be linked under the more abstract action node of stackOnA(block2, block3) capturing a plan for stacking block2 on block3 (i.e., onP(block2, block3)). Such structures can capture both the required substeps as well as those that are optional, and even mutually exclusive alternative action sequences for the same abstract action.

In one innovative example, the system 900 resides within a computing machine of a vehicle (e.g., an infotainment system or a vehicular control system). The actions 904 and states 906 include actions observed by sensors at the vehicle and data obtained via the global positioning system (GPS) of the vehicle. The actions 904 and states 906 may also include data provided by a traffic service, a meteorological service, and/or calendar data of a user of the vehicle (e.g., if the user linked their calendar to the computing machine of the vehicle). For example, the vehicle may determine, using the GPS, its position (in the sates 906) at consecutive times to determine that the vehicle is driving (in the actions 904) east on Main Street at a speed of 50 kilometers per hour. The vehicle may determine, based on a traffic service, that a bridge over a river at the east end of Main Street is closed to vehicular traffic. The vehicle may also determine, based on an online calendar of the user, that the user is likely driving to have lunch at a restaurant on the other side of the bridge from the vehicle's current location. The information about the bridge being closed may be stored in the states 906. The information about the user driving to the restaurant may be stored in the actions 904.

In this example, the plan recognizer engine 908 may determine, based on the observations 902 from the online calendar and of the vehicle's speed and direction, that the user of the vehicle is likely driving to the restaurant across the bridge. The causal structure 912 may be used to indicate that a plan to go to the restaurant would include driving east on Main Street and then going over the bridge. This plan is consistent with the online calendar of the user.

As illustrated, a planner engine 916 accesses the observation data structure 910. The planner engine 916 extends the observation data structure 910, in accordance with the causal structures 912 and the hierarchical relationships 914, to include predicted states 918 and/or predicted actions 920 that are not from the observations 902 while maintaining a format and a structure of the observation data structure 910. The predicted states 918 and/or the predicted actions 920 are incorporated into the observation data structure 910, similarly to the actions 904 and/or the states 906 from the observations 902.

In the above example, the planner engine 916 may determine, based on the user's calendar and the current location, speed, and direction of the vehicle, that the user plans to drive the vehicle over the bridge to get to the restaurant on the other side of the river. This may lead to the creation of a predicted action 920 of "driving over the bridge" and/or a predicted state 918 of "vehicle on the bridge."

A consistency rule engine 922 enforces consistency rules 924 on the observation data structure 910. The consistency rule engine 922 reduces the observation data structure 910. To do so, the consistency rule engine 922 determines whether a predicted state (from the predicted states 918) or a predicted action (from the predicted actions 920) is consistent with the observations 902 and the consistency rules 924. The consistency rule engine 922 maintains the predicted state or the predicted action if the predicted state or the predicted action is consistent with the observations 902 and the consistency rules 924. The consistency rule engine 922 removes the predicted state or the predicted action if the predicted state or the predicted action is inconsistent with the observations 902 and the consistency rules 924. The consistency rules 924 may include any rules that are applied to the system from which the observations 902 are generated. For example, the consistency rules 924 may include rules of physics, rules of traffic, or the like. After the consistency rule engine 922 enforces the consistency rules 924, the system 900 may generate an output based on the observation data structure 910. A consistency rule from the consistency rules 924 may be a first order predicate or conjunction of first order predicates, such that for an explanation data structure it can be determined if the predicate or conjunction holds. For example imagine two explanation data structures for the observed sequence of actions: [graspA (lefthand, block2), liftA(lefthand), moveoverA(lefthand, block3), releaseA(lefthand)]. One accounts for the observed actions as a plan to stack block2 on block3. The other accounts for the same actions as a plan to clear what ever surface block2 was initially on. The consistency rule based on testing if onP(block2, block3) is the goal of the plan can be used to differentiate these two explanation data structures. An explanation data structure may be a graph data structure that captures one complete and consistent set of possibly multiple goals and plans that are sufficient to account for the observed agent executing the actions in the input set. It should be noted that there may be a large number of such explanations. In our implementation each such data structure places each observed action or state change in order, within a structure that captures details of the action, the causal relations between the states in which the action is executed, and the state resulting from its execution. Further, the data structure contains structures that capture the organization of sets of the actions into larger sub-plans and even whole plans that achieve goals.

In the above example with the bridge, the consistency rules 924 may include a rule that vehicles cannot travel on roads that are closed to vehicular traffic. In this case, the consistency rule engine 922 may determine that the predicted action 920 of "driving over the bridge" and/or the predicted state 918 of "vehicle on the bridge" is inconsistent with the consistency rule 924 of the vehicle not traveling on roads that are closed to vehicular traffic. The computing machine may generate an output (e.g., that is played via a speaker of the vehicle's infotainment system) notifying the user that the bridge is closed. The output may also include a display of a map of an alternate route to the restaurant and/or activation of a navigation system to assist with navigation to the restaurant.

As further illustrated in FIG. 9, the system 900 includes plan structures 926. The plan structures 926 include structures for multiple different plans. For example, a plan structure for "take object," may include the steps of "reach," "grasp," and "lift." A plan structure for "book trip," may include the steps of "book flight," "book hotel," and "book rental car." Using the plan structures 926, the plan recognizer engine 908 maps the actions 904 and the states 906 in the observations 902 to a fully or partially completed plan (e.g., a plan prefix). Using the plan structures 926, the planner engine 916 generates the predicted states 918 and/or the predicted actions 920 for a partially completed plan represented in the observation data structure 920.

FIGS. 10A-10B illustrate examples of data representing a plan, in accordance with some embodiments. FIG. 10A illustrates observed plan data 1000A which includes observed actions and observed states of a recognized plan structure. FIG. 10B illustrates plan data 1000B, which includes a combination of observed actions, predicted actions, observed states of a recognized plan structure, and states components of the recognized plan structure.

As shown in FIG. 10A, the observed plan data 1000A includes observed actions 1002A. The observed actions 1002A may correspond to actions 904 in the observations 902 shown in FIG. 9. The observed actions 1002A are mapped onto states 1004A of a recognized plan structure. The states 1004A may correspond to states 906 in the observations 902. For example, if the plan is to attend a wedding in Napa, California, the observed actions 1002A may correspond to booking a flight to San Francisco Airport, confirming one's attendance at the wedding, and booking a hotel room. The observed states 1004A may correspond to the wedding not having been cancelled or changed to a different venue, the airline confirming the booking of the flight, and the hotel operator confirming the booking of the hotel room. In some cases, the plan recognizer engine 908 identifies that the plan is to attend the wedding in Napa based on the confirmation of attendance and the booking of the flight and hotel room. For example, the plan recognizer engine 908 maps the observed actions 1002A and the observed states 1004A to a portion (e.g., corresponding to a plan prefix) of one of the plan structures 926. The plan recognizer engine 908 may, with the affirmative consent of the user, monitor at least one of a computing device, an email address, a calendar, or a credit card of the user to identify the observed actions 1002A and/or the observed states 1004A.

FIG. 10B illustrates plan data 1000B. As shown, the plan data 100B includes the observed actions 1002A and the states 1004A from the observed plan data 1000A. In addition, the plan data 1000B includes predicted actions 1002B and predicted states 1004B. The predicted actions 1002B and/or the predicted states 1004B may be determined, by operation of the planner engine 916, and based on the plan structure from the plan structures 926 that was recognized, as corresponding to the observed actions 1002A and the observed states 1004A by the plan recognizer engine 908. The predicted states 1004B may include, for example, that the user is attending the wedding while wearing appropriate attire (e.g., a suit or a dress). A corresponding predicted action 1002B to these predicted states 1004B may include purchasing the appropriate attire and/or having the appropriate attire tailored. The predicted states 1004B may include traveling from San Francisco Airport to Napa by rental car. A corresponding predicted action 1002B may include booking a rental car. The predicted states 1004B may include traveling by taxi from one's home to the departure airport. A corresponding predicted action 1002B may include booking the taxi. In some cases, some predicted states might not have a corresponding predicted action.

According to some implementations, the predicted actions 1002B and/or the predicted states 1004B correspond to the predicted actions 920 and/or the predicted states 918 shown in FIG. 9, respectively. The predicted actions 1002B and/or the predicted states 1004B may be determined using the planner engine 916. Furthermore, a computing machine may generate an output based on the predicted actions 1002B and/or the predicted states. For example, a personal assistant application (e.g., on a mobile phone or a dedicated personal assistant device) might generate a suggestion for the user to obtain the appropriate attire, book the rental car, and/or book the taxi.

Figure 11:
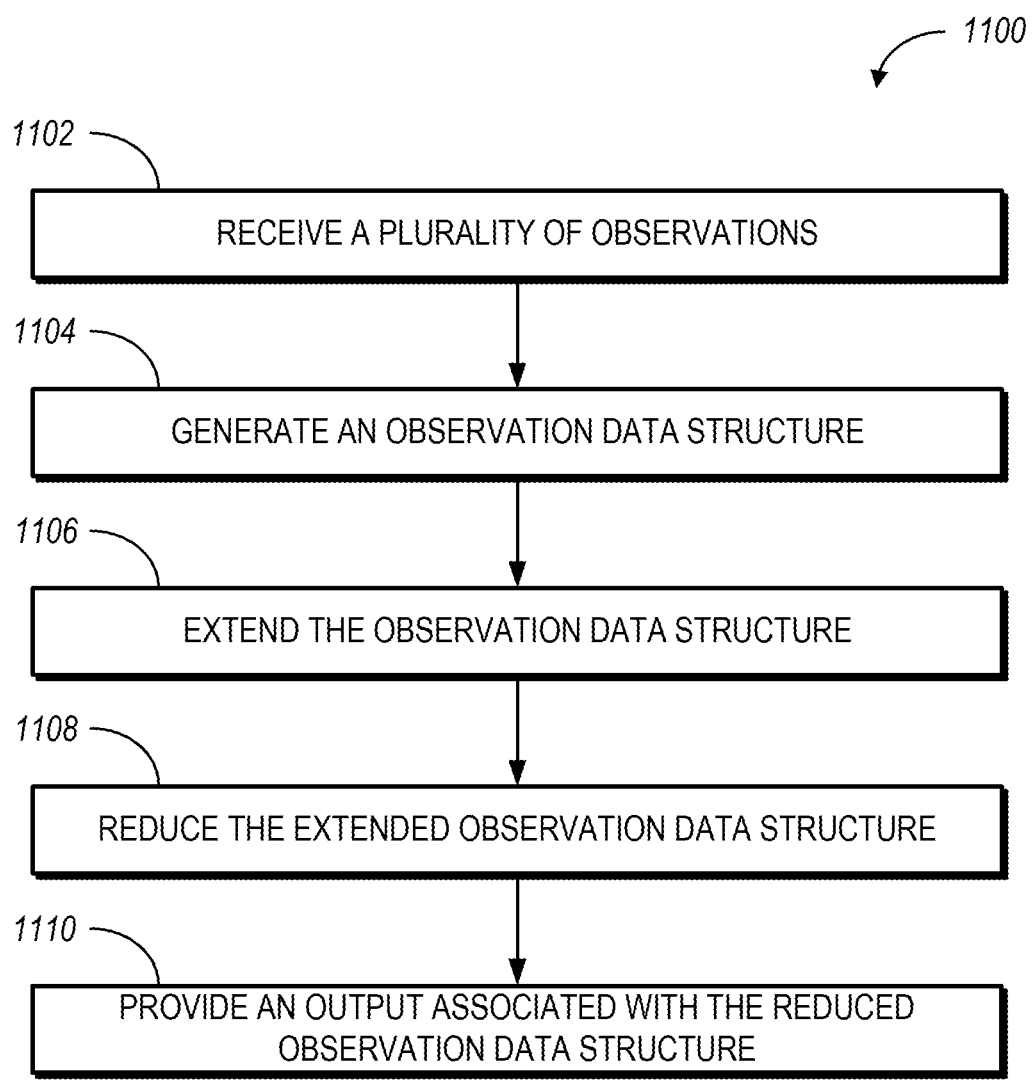
FIG. 11 is a flow chart of an example of a plan recognition method, in accordance with some embodiments.

FIG. 11 is a flow chart of an example of a plan recognition method 1100, in accordance with some embodiments. As described below, the method 1100 is performed by a computing machine (e.g., the computing machine 500 or the system 900). However, in alternative implementations, the method 1100 may be performed by other machines, for example, by a machine including all or a portion of the components of the computing machine 500 or by multiple computing machines working together.

At block 1102, the computing machine receives a plurality of observations (e.g., the observations 902). The plurality of observations include a set of actions (e.g., the actions 904) and a set of states (e.g., the states 906).

At block 1104, a plan recognizer engine (e.g., the plan recognizer engine 908) at the computing machine generates an observation data structure (e.g., the observation data structure 910). The observation data structure represents causal structures (e.g., the causal structures 912) and hierarchical relationships (e.g., the hierarchical relationships 914) between states and actions in the plurality of observations. In some cases, the computing machine sorts the plurality of observations into multiple groups, each group being associated with a plan or a plan prefix. In some cases, all or a portion of the observations in the observation data structure may be mapped to a plan prefix, representing initial steps towards the completion of a plan.

At block 1106, a planner engine (e.g., the planner engine 916) at the computing machine extends, in accordance with the causal structures and the hierarchical relationships, the observation data structure to include predicted states (e.g., the predicted states 918) or predicted actions (e.g., the predicted actions 920) that are not from the plurality of observations while maintaining a format and a structure of the observation data structure. If a plan prefix is mapped to the observation data structure, extending the observation data structure may include adding, to the observation data structure, a predicted state in accordance with a completion of a plan corresponding to the plan prefix. The predicted state is one of the predicted states generated at block 1106. The predicted state may include a state corresponding to the completion of the plan.

In some implementations, the computing machine maps the plurality of observations received at block 1102 to one or multiple plans. Extending the observation data structure (at block 1106) includes adding, to the observation data structure, a predicted state in accordance with the one or more plans. The predicted state is one of the predicted states generated at block 1106.

At block 1108, the computing machine reduces the extended observation data structure in accordance with consistency rules (e.g., the consistency rules 924) stored in a memory of the computing machine. In some cases, the computing machine determines whether a predicted state or a predicted action is consistent with the plurality of observations and the consistency rules. The computing machine maintains the predicted state or the predicted action if the predicted state or the predicted action is consistent with the plurality of observations and the consistency rules. The computing machine removes the predicted state or the predicted action if the predicted state or the predicted action is inconsistent with the plurality of observations or the consistency rules.

In some implementations, extending the observation data structure (at block 1106) includes receiving indicia of additional actions taken by an agent associated with the set of actions. Reducing the extended observation data structure (at block 1108) includes verifying that the additional actions are in accordance with the consistency rules and removing at least one additional action that is not in accordance with the consistency rules.

At block 1110, the computing machine provides an output associated with the reduced observation data structure. The output may include a prompt to take an action or refrain from taking an action based on the reduced observation data structure. The output may be provided for display at a display unit or played via an audio speaker. Alternatively, the output may be transmitted (e.g., via a network) to another computing machine or to a messaging address.

In some examples, the output includes a belief, a goal, a plan or an intention of an agent associated with (e.g., performing) the actions or the states. The computing machine determines the belief, the goal, the plan or the intention based on the causal structures or the hierarchical relationships in the reduced observation data structure. In some examples, the output includes a predicted future state. The predicted future state may be determined based on the plan. As used herein, the term "belief" may include, among other things, a first order predicate or conjunction of first order predicates that specifically capture the beliefs of either the observed agent or another agent within the environment. In some implementations, this is captured by adding an additional parameter to the predicate that identifies which agent hold the belief (i.e., inRoomP(agent23, block7, room23) captures the fact that agent 23 believes that block7 is in room23. In contrast inRoomP(block7, room23) captures the fact that in represented world block7 is in room23. Some implementations support the presence of typed variables in the belief specification. For example, inRoomP (agent23, block7, X:room) may denote that agent23 believes that block7 is in some room that will likely be bound at a later time in the plan.

In some examples, the plan recognizer engine and the planner engine operate using multithreaded processing circuitry. The plan recognizer engine and the planner engine may each individually be parallelized, with the planner engine leveraging the output of the plan recognizer engine. The multithreaded processing circuitry, using the parallelization of the plan recognizer engine and the planner engine, generates the output in real-time after receiving the plurality of observations. Alternatively, in some implementations, parallelization might not be used, and the processing circuitry might still generate the output in real-time after receiving the plurality of observations. As a result, a user is able to take action based on the output before the plan is completed or abandoned, and the output becomes irrelevant to the user. For example, if a user begins baking a cake (e.g., by mixing the ingredients for the cake), the technique disclosed herein may be used to determine that the user has begun baking a cake and determine that the user will not be able to complete baking the cake because the user's spouse is using the oven to cook a meatloaf and only one oven is available. The user may be notified (e.g., by a push notification to a mobile phone or by audio playback at an in-home personal assistant device) that they will not be able to complete baking the cake because the oven is being used for another project. As a result, the user might abandon the cake baking project before too many of the ingredients have been mixed. Also, the user may have time to obtain a cake using another scheme (e.g., by driving to a bakery to buy a cake).

Some implementations of the disclosed technology may leverage artificial neural networks or machine learning. Alternatively, the disclosed technology may be implemented without artificial neural network technology and without machine learning technology. Some implementations obtain input observations and build the explanation structures from the input observations. This can be accomplished without artificial neural networks and without machine learning.

Some implementations use computational technology to leverage the complexity of the resulting observation data structures.

The initial observation data structure can have multiple explanation data structures within itself.

Each such explanation data structure places each observed action or state change in order, within a structure that captures details of the action. The causal relations between the statistics in which each action is executed and the results of executing each action. Furthermore, the observation data structure contains more abstract structures that capture the organization of sets of the actions into larger sub-plans and even whole plans that achieve goals. The size of the resulting structures depends on the number of observed actions.

In some implementations, each explanation structure is a graph with the following form. If the number of observations is n, each explanation structure has n action observation nodes. It also has n+1 world state nodes (capturing the state before and after the execution of each action). Each action node has a minimum of two edges between it and its previous and consequent states for a total of 2(n)+1 edges.

In some implementations for the simplest case, the explanation structure also has $n \log_{2}(n)$ nodes capturing the structure of the plan being followed. Thus, the graph capturing an explanation data structure has at the minimum $2n \log_{2}(n)+1$ action and state nodes and $2n \log_{2}(n)$ links. It should be noted that this does not account for any complexity in the representation of the world states which should be taken into account. The representation of the world states may, in some cases, be treated as a multiplicative constant on these figures. Thus, the size of an individual explanation data structure graph depends polynomially on the number of input observations.

It should be noted that the above analysis only accounts for a single explanation. The initial observation structure computed by the plan recognition engine may contain multiple such explanations. Some input observation sequences given to a plan recognition engine may involve the production of an exponentiation number of such explanation data structure graphs.

In summary then, the first step of an example process disclosed herein produces an initial observation data structure that contains an exponential number of individual explanation data structures (the size of each of which is polynomial in the number of observations).

The second step of an example of the process may involve for extending each of these explanation graphs using the planner engine. This extension calls for the creation of multiple instances of each input explanation data structure. Each possible choice in how the plan may be continued in the future is represented by its own instance of the explanation data structure.

Thus, this extension process can result in multiplying the number of explanation data structure graphs by the number of possible alternatives to each possible choice for how each plan in the explanation could be completed. Searching this space of possible completions of each explanation data structure using a planning engine may be in the most computationally complex class and if a complete search is used for the domain, it may leverage the production of an unbounded number of explanation data structures. Thus, the plan recognition engine and the planning engine both create and extend a data structure that is more than exponentially linked in size to the number of observations.

Some embodiments are described as numbered examples (Example 1, 2, 3, etc.). These are provided as examples only and do not limit the technology disclosed herein.

Example 1 is a method comprising: receiving, by a computing machine, a plurality of observations, the plurality of observations including a set of actions and a set of states; generating, by a plan recognizer engine at the computing machine, an observation data structure, wherein the observation data structure represents causal structures and hierarchical relationships between states and actions in the plurality of observations; extending, by a planner engine at the computing machine and in accordance with the causal structures and hierarchical relationships, the observation data structure to include, predicted states or predicted actions that are not from the plurality of observations while maintaining a format and a structure of the observation data structure; reducing, in accordance with consistency rules stored in a memory of the computing machine, the extended observation data structure by: determining whether a predicted state or a predicted action is consistent with the plurality of observations and the consistency rules; maintaining the predicted state or the predicted action if the predicted state or the predicted action is consistent with the plurality of observations and the consistency rules; and removing the predicted state or the predicted action if the predicted state or the predicted action is inconsistent with the plurality of observations or the consistency rules; and providing an output associated with the reduced observation data structure.

In Example 2, the subject matter of Example 1 includes, wherein the plan recognizer engine and the planner engine operate in parallel using multithreaded processing circuitry, and wherein the multithreaded processing circuitry generates the output in real-time after receiving the plurality of observations.

In Example 3, the subject matter of Examples 1-2 includes, wherein the observation data structure comprises a graph data structure including nodes and edges connecting the nodes, wherein the nodes represent the states and the actions, and wherein the edges represent the causal structures or the hierarchical relationships between the nodes.

In Example 4, the subject matter of Examples 1-3 includes, the output comprising at least one of a belief, a goal, a plan, or an intention of an agent associated with the actions or the states, the method comprising: determining the at least one of the belief, the goal, the plan, or the intention based on the causal structures of the hierarchical relationships in the reduced observation data structure.

In Example 5, the subject matter of Examples 1-4 includes, the output comprising a predicted future state.

In Example 6, the subject matter of Examples 1-5 includes, the causal structures comprising at least one of a causal relationship between two or more actions from the set of actions, a state change associated with one or more actions from the set of actions, or a subplan of an agent performing at least a portion of the actions from the set of actions.

In Example 7, the subject matter of Examples 1-6 includes, mapping the plurality of observations to an execution of a plan prefix.

In Example 8, the subject matter of Example 7 includes, wherein extending the observation data structure comprises:

adding, to the observation data structure, a predicted state in accordance with a completion of a plan corresponding to the plan prefix, wherein the predicted state is one of the predicted states.

In Example 9, the subject matter of Example 8 includes, wherein the predicted states include a state corresponding to the completion of the plan.

In Example 10, the subject matter of Examples 1-9 includes, mapping the plurality of observations to an execution of one or more plans, wherein extending the observation data structure comprises: adding, to the observation data structure, a predicted state in accordance with the one or more plans, wherein the predicted state is one of the predicted states.

In Example 11, the subject matter of Examples 1-10 includes, sorting the plurality of observations into multiple groups, each group being associated with a plan or a plan prefix.

In Example 12, the subject matter of Examples 1-11 includes, wherein extending the observation data structure comprises: receiving indicia of additional actions taken by an agent associated with the set of actions, and wherein reducing the extended observation data structure comprises: verifying that the additional actions are in accordance with the consistency rules and removing at least one additional action that is not in accordance with the consistency rules.

Example 13 is a machine-readable medium storing instructions which, when executed by a computing machine, cause the computing machine to perform operations comprising: receiving, by a computing machine, a plurality of observations, the plurality of observations including a set of actions and a set of states; generating, by a plan recognizer engine at the computing machine, an observation data structure, wherein the observation data structure represents causal structures and hierarchical relationships between states and actions in the plurality of observations; extending, by a planner engine at the computing machine and in accordance with the causal structures and hierarchical relationships, the observation data structure to include, predicted states or predicted actions that are not from the plurality of observations while maintaining a format and a structure of the observation data structure; reducing, in accordance with consistency rules stored in a memory of the computing machine, the extended observation data structure by: determining whether a predicted state or a predicted action is consistent with the plurality of observations or the consistency rules; maintaining the predicted state or the predicted action if the predicted state or the predicted action is consistent with the plurality of observations and the consistency rules; and removing the predicted state or the predicted action if the predicted state or the predicted action is inconsistent with the plurality of observations and the consistency rules; and providing an output associated with the reduced observation data structure.

In Example 14, the subject matter of Example 13 includes, wherein the plan recognizer engine and the planner engine operate in parallel using multithreaded processing circuitry, and wherein the multithreaded processing circuitry generates the output in real-time after receiving the plurality of observations.

In Example 15, the subject matter of Examples 13-14 includes, wherein the observation data structure comprises a graph data structure including nodes and edges connecting the nodes, wherein the nodes represent the states and the actions, and wherein the edges represent the causal structures or the hierarchical relationships between the nodes.

In Example 16, the subject matter of Examples 13-15 includes, the output comprising at least one of a belief, a goal, a plan, or an intention of an agent associated with the actions or the states, the method comprising: determining the at least one of the belief, the goal, the plan, or the intention based on the causal structures of the hierarchical relationships in the reduced observation data structure.

Example 17 is a system comprising: processing circuitry; and a memory storing instructions which, when executed by the processing circuitry, cause the processing circuitry to perform operations comprising: receiving, by a computing machine, a plurality of observations, the plurality of observations including a set of actions and a set of states; generating, by a plan recognizer engine at the computing machine, an observation data structure, wherein the observation data structure represents causal structures and hierarchical relationships between states and actions in the plurality of observations; extending, by a planner engine at the computing machine and in accordance with the causal structures and hierarchical relationships, the observation data structure to include, predicted states or predicted actions that are not from the plurality of observations while maintaining a format and a structure of the observation data structure; reducing, in accordance with consistency rules stored in a memory of the computing machine, the extended observation data structure by: determining whether a predicted state or a predicted action is consistent with the plurality of observations and the consistency rules; maintaining the predicted state or the predicted action if the predicted state or the predicted action is consistent with the plurality of observations and the consistency rules; and removing the predicted state or the predicted action if the predicted state or the predicted action is inconsistent with the plurality of observations or the consistency rules; and providing an output associated with the reduced observation data structure.

In Example 18, the subject matter of Example 17 includes, wherein the plan recognizer engine and the planner engine operate in parallel using multithreaded processing circuitry, and wherein the multithreaded processing circuitry generates the output in real-time after receiving the plurality of observations.

In Example 19, the subject matter of Examples 17-18 includes, wherein the observation data structure comprises a graph data structure including nodes and edges connecting the nodes, wherein the nodes represent the states and the actions, and wherein the edges represent the causal structures or the hierarchical relationships between the nodes.

In Example 20, the subject matter of Examples 17-19 includes, the output comprising at least one of a belief, a goal, a plan, or an intention of an agent associated with the actions or the states, the method comprising: determining the at least one of the belief, the goal, the plan, or the intention based on the causal structures of the hierarchical relationships in the reduced observation data structure.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system comprising processing circuitry and memory, the processing circuitry to implement of any of Examples 1-20.

Example 24 is a method to implement of any of Examples 1-20.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving, by a computing machine, a plurality of observations, the plurality of observations including a set of actions and a set of states;
    generating, by a plan recognizer engine at the computing machine, an observation data structure, wherein the observation data structure represents causal structures and hierarchical relationships between states and actions in the plurality of observations;
    extending, by a planner engine at the computing machine and in accordance with the causal structures and the hierarchical relationships, the observation data structure to include predicted actions that have not yet occurred and are not from the plurality of observations while maintaining a format and a structure of the observation data structure;
    reducing, in accordance with consistency rules stored in a memory of the computing machine, the extended observation data structure by:
        determining whether a predicted action is consistent with the plurality of observations and the consistency rules; and
        maintaining or removing the predicted action based on whether the predicted action is consistent with the plurality of observations and the consistency rules; and
    providing an output associated with the reduced observation data structure, wherein the consistency rules comprise logical constraints derived from domain-specific knowledge.

2. The method of claim 1, wherein the plan recognizer engine and the planner engine operate in parallel using multithreaded processing circuitry, and wherein the multithreaded processing circuitry generates the output in real-time after receiving the plurality of observations.

3. The method of claim 1, wherein the observation data structure comprises a graph data structure including nodes and edges connecting the nodes, wherein the nodes represent the states and the actions, and wherein the edges represent the causal structures or the hierarchical relationships between the nodes.

4. The method of claim 1, the output comprising at least one of a belief, a goal, a plan, or an intention of an agent associated with the actions or the states, the method comprising:
    determining the at least one of the belief, the goal, the plan, or the intention based on the causal structures of the hierarchical relationships in the reduced observation data structure.

5. The method of claim 1, the output comprising a predicted future state.

6. The method of claim 1, the causal structures comprising at least one of a causal relationship between two or more actions from the set of actions, a state change associated with one or more actions from the set of actions, or a subplan of an agent performing at least a portion of the actions from the set of actions.

7. The method of claim 1, further comprising:
    mapping the plurality of observations to an execution of a plan prefix.

8. The method of claim 7, wherein extending the observation data structure comprises:
    adding, to the observation data structure, a predicted state in accordance with a completion of a plan corresponding to the plan prefix, wherein the predicted state is one of the predicted states.

9. The method of claim 8, wherein the predicted states include a state corresponding to the completion of the plan.

10. The method of claim 1, further comprising:
    mapping the plurality of observations to an execution of one or more plans, wherein extending the observation data structure comprises:

adding, to the observation data structure, a predicted state in accordance with the one or more plans, wherein the predicted state is one of the predicted states.

11. The method of claim 1, further comprising:
sorting the plurality of observations into multiple groups, each group being associated with a plan or a plan prefix.

12. The method of claim 1, wherein extending the observation data structure comprises: receiving indicia of additional actions taken by an agent associated with the set of actions, and wherein reducing the extended observation data structure comprises: verifying that the additional actions are in accordance with the consistency rules and removing at least one additional action that is not in accordance with the consistency rules.

13. A non-transitory machine-readable medium storing instructions which, when executed by a computing machine, cause the computing machine to perform operations comprising:
receiving, by a computing machine, a plurality of observations, the plurality of observations including a set of actions and a set of states;
generating, by a plan recognizer engine at the computing machine, an observation data structure, wherein the observation data structure represents causal structures and hierarchical relationships between states and actions in the plurality of observations;
extending, by a planner engine at the computing machine and in accordance with the causal structures and the hierarchical relationships, the observation data structure to include predicted actions that have not yet occurred and are not from the plurality of observations while maintaining a format and a structure of the observation data structure;
reducing, in accordance with consistency rules stored in a memory of the computing machine, the extended observation data structure by:
determining whether a predicted action is consistent with the plurality of observations or the consistency rules; and
maintaining or removing the predicted action based on whether the predicted action is consistent with the plurality of observations and the consistency rules; and
providing an output associated with the reduced observation data structure, wherein the consistency rules comprise logical constraints derived from domain-specific knowledge.

14. The machine-readable medium of claim 13, wherein the plan recognizer engine and the planner engine operate in parallel using multithreaded processing circuitry, and wherein the multithreaded processing circuitry generates the output in real-time after receiving the plurality of observations.

15. The machine-readable medium of claim 13, wherein the observation data structure comprises a graph data structure including nodes and edges connecting the nodes, wherein the nodes represent the states and the actions, and wherein the edges represent the causal structures or the hierarchical relationships between the nodes.

16. The machine-readable medium of claim 13, the output comprising at least one of a belief, a goal, a plan, or an intention of an agent associated with the actions or the states, the method comprising:

determining the at least one of the belief, the goal, the plan, or the intention based on the causal structures of the hierarchical relationships in the reduced observation data structure.

17. A system comprising:
processing circuitry; and
a memory storing instructions which, when executed by the processing circuitry, cause the processing circuitry to perform operations comprising:
receiving, by a computing machine, a plurality of observations, the plurality of observations including a set of actions and a set of states;
generating, by a plan recognizer engine at the computing machine, an observation data structure, wherein the observation data structure represents causal structures and hierarchical relationships between states and actions in the plurality of observations;
extending, by a planner engine at the computing machine and in accordance with the causal structures and the hierarchical relationships, the observation data structure to include predicted actions that have not yet occurred and are not from the plurality of observations while maintaining a format and a structure of the observation data structure;
reducing, in accordance with consistency rules stored in a memory of the computing machine, the extended observation data structure by:
determining whether a predicted action is consistent with the plurality of observations and the consistency rules; and
maintaining or removing the predicted action based on whether the predicted action is consistent with the plurality of observations and the consistency rules; and
providing an output associated with the reduced observation data structure, wherein the consistency rules comprise logical constraints derived from domain-specific knowledge.

18. The system of claim 17, wherein the plan recognizer engine and the planner engine operate in parallel using multithreaded processing circuitry, and wherein the multithreaded processing circuitry generates the output in real-time after receiving the plurality of observations.

19. The system of claim 17, wherein the observation data structure comprises a graph data structure including nodes and edges connecting the nodes, wherein the nodes represent the states and the actions, and wherein the edges represent the causal structures or the hierarchical relationships between the nodes.

20. The system of claim 17, the output comprising at least one of a belief, a goal, a plan, or an intention of an agent associated with the actions or the states, the method comprising:
determining the at least one of the belief, the goal, the plan, or the intention based on the causal structures of the hierarchical relationships in the reduced observation data structure.

21. The method of claim 1, wherein the consistency rules comprise rules of physics.

22. The method of claim 1, wherein the consistency rules comprise rules of traffic.

* * * * *

UNITED STATES PATENT AND TRADEMARK OFFICE
CERTIFICATE OF CORRECTION

PATENT NO. : 12,292,876 B2  
APPLICATION NO. : 18/140104  
DATED : May 6, 2025  
INVENTOR(S) : Geib et al.

Page 1 of 1

It is certified that error appears in the above-identified patent and that said Letters Patent is hereby corrected as shown below:

In the Specification

In Column 1, after Line 3, and before Line 4, immediately after the title, please insert the following:
--STATEMENT REGARDING FEDERALLY
SPONSORED RESEARCH OR DEVELOPMENT
This invention was made with government support under Contract Number FA8650-22-P-6415 awarded by Air Force Research Laboratory (AFRL). The government has certain rights in this invention.--

Signed and Sealed this  
Third Day of June, 2025

Coke Morgan Stewart  
*Acting Director of the United States Patent and Trademark Office*